(12) United States Patent
Lansing et al.

(10) Patent No.: US 11,131,632 B2
(45) Date of Patent: Sep. 28, 2021

(54) MEASURING DEVICE WITH INJECTOR AND SPRAY DEFLECTOR

(71) Applicant: TECAN TRADING AG, Mannedorf (CH)

(72) Inventors: Manfred Lansing, Salzburg (AT); Johannes Posch, Hallein (AT); Tobias Sawetzki, Berchtesgaden (DE)

(73) Assignee: TECAN TRADING AG, Mannedorf (CH)

( * ) Notice: Subject to any disclaimer, the term of this patent is extended or adjusted under 35 U.S.C. 154(b) by 258 days.

(21) Appl. No.: 16/325,647

(22) PCT Filed: Aug. 17, 2017

(86) PCT No.: PCT/EP2017/070859
§ 371 (c)(1),
(2) Date: Feb. 14, 2019

(87) PCT Pub. No.: WO2018/033600
PCT Pub. Date: Feb. 22, 2018

(65) Prior Publication Data
US 2019/0195807 A1    Jun. 27, 2019

(30) Foreign Application Priority Data

Aug. 19, 2016   (CH) .................................. 01072/16

(51) Int. Cl.
*G01N 21/76*    (2006.01)
*G01N 21/15*    (2006.01)
*G01N 21/25*    (2006.01)

(52) U.S. Cl.
CPC ............. *G01N 21/76* (2013.01); *G01N 21/15* (2013.01); *G01N 21/253* (2013.01)

(58) Field of Classification Search
CPC ........ G01N 21/76; G01N 21/75; G01N 21/00; G01N 21/15; G01N 21/01; G01N 21/253; G01N 21/251; G01N 21/25; G01N 21/17
(Continued)

(56) References Cited

U.S. PATENT DOCUMENTS 5,082,628 A * 1/1992 Andreotti ............. G01N 21/253
422/82.08
5,290,513 A * 3/1994 Berthold ................ G01N 21/76
250/328
(Continued)

FOREIGN PATENT DOCUMENTS

EP    0523521 A2    1/1993
EP    1441216 A2    7/2004
(Continued)

OTHER PUBLICATIONS

International Search Report for corresponding PCT application No. PCT/EP2017/070859, dated Oct. 20, 2017.

*Primary Examiner* — Christine T Mui
(74) *Attorney, Agent, or Firm* — Notaro, Michalos & Zaccaria P.C.

(57) ABSTRACT

A measuring device for the measurement of light signals emitted from samples in wells of a microplate, in particular to a luminescence measuring device for measuring luminescence signals. The luminescence measuring device has a first injector with an injector needle having an outlet end for dispensing a reagent into a well, and a luminescence optical device having an optical axis extending substantially perpendicularly to the microplate and a measuring region surrounding the optical axis. The injector needle extends to below the luminescence optical device and opens with its outlet end into the measuring region. The luminescence measuring device has further a spray deflector arranged
(Continued)

between the outlet end of the injector and the luminescence optical device.

15 Claims, 4 Drawing Sheets

(58) Field of Classification Search
USPC ............... 422/82.05, 82.08, 82.09; 436/172
See application file for complete search history.

(56) References Cited

U.S. PATENT DOCUMENTS

| | | | |
|---|---|---|---|
| 5,611,994 A | | 3/1997 | Bailey et al. |
| 6,144,455 A | * | 11/2000 | Tuunanen ............ G01N 21/6452 356/344 |
| 7,419,836 B2 | | 9/2008 | Schuerf et al. |
| 7,473,897 B2 | * | 1/2009 | Braendle ............. G01F 23/2927 250/343 |
| 2007/0183931 A1 | | 8/2007 | Stock |

FOREIGN PATENT DOCUMENTS

| | | |
|---|---|---|
| WO | 97/11354 A1 | 3/1997 |
| WO | 01/96837 A1 | 12/2001 |

* cited by examiner

MEASURING DEVICE WITH INJECTOR AND SPRAY DEFLECTOR

The present invention relates to a measuring device having an injector, an optical system for measuring signals emitted by a sample and a spray deflector for the luminescence optical system.

Luminescence measuring devices, if installed as stand-alone devices, are known as so-called luminometers from the prior art. Luminescence is the light emitted by a sample after excitation, e.g. by a chemical or biochemical reaction, which is released by a sample. Corresponding samples can be provided in cuvettes, which usually have a capacity of approx. 1.5 ml to 2 ml. A starter solution can then be added to the cuvettes from above, and the sample is measured for luminescence along a horizontal readout direction by means of laterally arranged optics.

If a large number of samples are to be analyzed, the samples are typically provided in standardized microplates. One of the most common microplates in laboratory technology is the 96-well microplate, which comprises 12×8 wells (i.e. the reaction cups) in a standardized array. The standardization includes, inter alia, the arrangement of the individual wells, their distance from each other and the size and layout of the footprint.

The respective aspects are, for example, defined in the ANSI_SBS 1-2-3-4-2004 standard. According to this standard, for example, a standard 96-well microplate has a 9 mm center distance between individual wells and a standard 384-well microplate has a 4.5 mm center distance between individual wells.

The advantage of such standardized microplates is that they are particularly suitable for automated analysis of samples with high throughput. For example, luminescence can be measured automatically for each well in a so-called microplate reader. In the microplate reader, each well can then be positioned opposite a luminescence measuring device and the sample can be measured in this well. So-called multimode microplate readers are also known from the prior art, which for example can not only measure luminescence intensities but additionally fluorescence intensities and/or the absorption of light from a sample. An example of such a multimode microplate reader is the so-called Infinite® 200 Pro or the Spark® 20M of the present applicant.

With regard to the luminescence of a sample, different forms of luminescence are distinguished depending on the type of excitation: Bioluminescence is triggered by bioluminescent substances in living organisms (such as luciferin in fireflies); chemiluminescence, on the other hand, is triggered by a chemical reaction. Photoluminescence is triggered by light of a specific wavelength and is also known as fluorescence.

One advantage of chemiluminescence is that a luminescence signal can be triggered specifically by adding the corresponding reagent(s) in a time-controlled manner. In the so-called glow luminescence, the triggered luminescence signal is visible for several minutes, and sometimes several minutes may elapse from the start of the reaction until a stable signal can actually be detected. With the so-called flash luminescence, on the other hand, the signal maximum is reached abruptly after the start of the reaction—depending on the type of reaction, this can already be within approx. 200 to 300 microseconds (μ sec). Typically, the signal of a flash luminescence decays in a very short time (e.g. within 2 to 3 seconds). However, compared to glow luminescence, the flash luminescence signal is usually much stronger and the detection limit is much lower.

In order to capture the flash luminescence signal as completely as possible, it is also necessary to add the reagents in such a way as to ensure rapid and complete mixing of the reaction partners.

Flash luminescence is measured due to the fast kinetics, for example, in clinical diagnostics in cuvettes, because the desired reaction in the sample can be triggered relatively easily by adding the reagents and a luminescence measurement can be performed simultaneously. Glow luminescence is particularly well suited for the analysis of samples in microplate readers. For an automated addition, the microplate reader includes an injector, via which the respective reagent is added and released into a specific well of the microplate. In the most common variant, the injector outlet is offset by one or more wells in relation to the luminescence optic devices with which a triggered luminescence signal is to be measured.

Such an offset is possible because the slower kinetics of glow luminescence result in a longer time window between the addition of reagents and the start of luminescence than with fast flash luminescence. The advantage of a spatial offset of the injector outlet and optics is that any splashes caused by the release of liquid into the sample do not hit the optics, thus keeping the optics clean. This guarantees that the reagent liquid does not optically falsify the luminescence measurement and does not attack it if, as is often the case with flash luminescence, sodium hydroxide (NaOH) and hydrogen peroxide ($H_2O_2$) are used, for example. On the other hand, it is disadvantageous that due to the necessary shifting of the corresponding well towards the optics, valuable time may elapse during flash luminescence for the measurement until the measurement can actually be started.

In the prior art, a luminescence arrangement is known from document U.S. Pat. No. 5,611,994 in which an injector is arranged towards a microplate and a luminescence optical system in such a way that the delivery of reagents with the injector needle takes place obliquely from above into the same well which is to be measured with respect to the luminescence by means of the optics arranged above. A perforated mask is positioned between the microplate and the optics to protect against splashes, and the injector needle is retracted for optical measurement so that the optical measuring region above the well is not restricted by the presence of the injector needle.

The patent specification U.S. Pat. No. 7,419,836 B2 of the current applicant also describes the use of a perforated plate in a microplate reader, which is arranged in a horizontally movable manner between an upper luminescence optical device and the microplate. The injector is arranged horizontally above the perforated plate, and the outlet of the injector needle ends in the well of the microplate, above which the optics are positioned for luminescence measurement. The perforated screen defines the observation range for the optics. For the situation where there is no microplate in the microplate reader, another protective shield is provided underneath the carriage, which would otherwise hold the microplate. In this way, additional optical parts that are still underneath the carriage are protected against unintentional dripping of liquid from the injector.

The advantage of using perforated plates is that there is a certain degree of spray protection for the measuring optics above the injector outlet, and liquids can be dosed relatively easily into a well despite the spray protection. Disadvantages of such perforated plates are that they can cause shading on the sample if the aperture is chosen relatively small as the spray protection. Such shadowing can falsify the measured luminescence signals. If the aperture is selected larger to avoid such shadowing, there is a risk that splashes may still reach the optics.

It is an object of the present invention to provide a luminescence measuring device which eliminates the disadvantages mentioned above.

The object of the present invention is solved by the features of the independent claim 1.

In particular, the use of a luminescence measuring device having a luminescence optical device arranged above the outlet end of the injector needle and having a continuous spray deflector arranged between the optical device and the outlet end makes it possible for a reagent to be simultaneously added to a selected well of a microplate and a luminescence measurement to be started in the same well.

The advantage of such a luminescence measuring device according to the invention is that:

For example, a flash luminescence in a sample of a certain well of a microplate can be triggered and started simultaneously with the measurement. Despite fast reaction kinetics, the triggered reaction can be detected by the detector system without loss of time and/or data.

In the illustrated embodiment, the glass plate can be easily cleaned and replaced as required without any special technical effort.

In addition, it is ensured that the sensitive luminescence optical device of the detector system is not contaminated by possible liquid splashes during the injection and that the reaction signals are falsified by liquid drops on the optical device.

Since frequent reagents for triggering flash luminescence are sodium hydroxide (caustic soda/NaOH) and hydrogen peroxide, for example, there is also no danger of the optical device being damaged by splashes of such highly reactive reagents, e.g. by corrosion.

Embodiments of the present invention will be explained in more detail below by means of figures, wherein.

Figure 1:
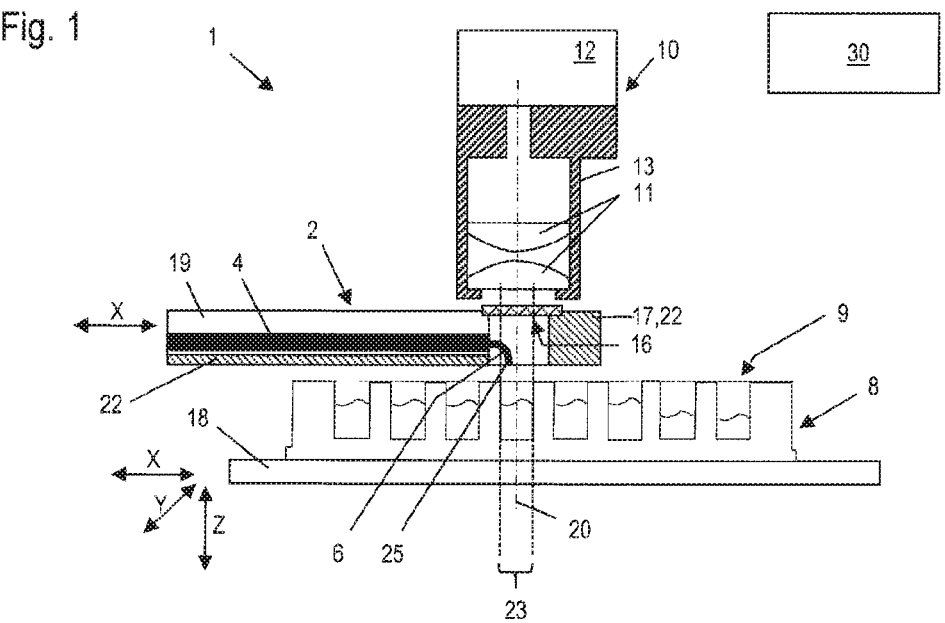
FIG. 1 shows a schematic overview drawing of an exemplary luminescence measuring device with a horizontally arranged injector.

The present measuring device according to the invention is described using the special example of a luminescence measuring device 1 for measuring luminescence signals from samples in wells 9 of a microplate 8. In general, however, it is a measuring device which is generally configured to measure light emitted by samples arranged in wells of a microplate. The light to be measured or detected can have different wavelengths, be of different nature and be triggered in different ways, wherein the optical device 10,10',10" used and the respective light paths, optical axes 20,31,32 and detection systems are preferably adapted to the light to be detected. As an alternative to the detection of luminescence signals, the measuring device according to the invention can, therefore, be configured to measure fluorescence signals coming from a sample or to measure the absorption of light by a sample. However, in preferably all embodiments, the measuring device in accordance with the invention comprises at least one injector 2 for triggering a light signal to be measured and a spray deflector 16, as described further below.

FIG. 1 shows a schematic overview drawing of an exemplary luminescence measuring device 1 in a simple embodiment with one injector 2. The injector 2 comprises a supply line 4, which is arranged horizontally as an example in the luminescence measuring device 1 shown. The injector 2 also comprises an injector needle 6 with an outlet end 25. A liquid, preferably a reagent for triggering luminescence in a sample, can be fed into the injector needle 6 via a pump and valve system (not shown) and the supply line 4 and discharged through the outlet end 25. If the outlet end 25 is positioned above a well 9 of a microplate 8, the reagent is dispensed into this well 9. The injector 2 is preferably configured in such a way that liquid volumes in the range from 1 µl to the maximum working volume of the microplate well, e.g. 300 µl in a well of a 96-well microplate, can be dispensed.

Preferably in all embodiments, the injector 2 comprises a supply line 4, which is arranged at a distance from the luminescence optical device 10 and its optical axis 20. The injector needle 6 is connected to the supply line 4 at the end opposite its outlet end 25.

To trigger the reaction, which releases luminescent light, a reagent is added with the injector 2 to the well 9 of the sample to be analyzed, which starts the reaction. Such a reagent may contain a substrate or an enzyme, for example. Luminescence assays are known from the prior art. One example is the LIAISON® XL Anti-HBs II Assay from DiaSorin for the detection of antibodies against a hepatitis B surface antigen.

The luminescence measuring device 1 further comprises a luminescence optical device 10, which is configured to measure a luminescence signal of a sample. The luminescence optical device 10 comprises an optical axis 20 and a measuring region 23 surrounding the optical axis 20. For measuring a luminescence signal of a sample, which is located in a well 9 of a microplate 8, the luminescence optical device 10 is aligned with respect to this microplate 8 in such a way that the optical axis 20 extends substantially perpendicularly to the microplate 8 or to its base surface.

The positioning of the luminescence optical device 10 above the microplate 8 is particularly preferred. In this way, the light coming from the sample can be guided directly and essentially unaltered onto the luminescence optical device 10 without the light having to pass through the bottom of the microplate 8. Signal falsifications, which can occur due to possible absorption by the material of the microplate, can thus be avoided.

The measuring region 23 enclosing the optical axis 20 corresponds to the range of the well 9, which is accessible from above through the luminescence optical device 10, for the measurement of luminescence signals in the case where samples are provided in wells 9 of a microplate 8. Ideally, the measuring region 23 corresponds to the diameter of a well, since in this way, the entire well 9 is accessible for measurement through the luminescence optical device 10 above it.

To measure luminescence signals from samples with the luminescence measuring device 1, the light of a selected wavelength coming from a sample is normally detected during a predetermined time (e.g. during one minute for glow luminescence measurements or during a few seconds for flash luminescence measurements) and, if necessary, converted to a signal value per second. The intensity of the selected light radiation is indicated e.g. in RLU (Relative Light Unit). Light coming from the sample is first collected by an optical device 10 and guided to the luminescence detector. The luminescence detector 12 may include a filter system to filter the wavelength of the light to be measured, and a photomultiplier tube (PMT) to convert and amplify the photon signal into an electric current.

A sample is any type of material that is to be analyzed in terms of its chemical composition or certain properties. For luminescence measurements, especially in so-called microplate readers, samples in a liquid are preferably used. These can be biochemical molecules (such as nucleic acids, sugars, proteins, etc.) or other substances dissolved in a defined liquid (e.g. a buffer solution or another solvent). It can also be direct liquid samples, e.g. blood/serum/urine, etc., which are mixed or diluted with a suitable reagent.

Such samples are preferably provided in standardized sample containers, especially preferred in the already mentioned standard microplates with 96, 384 or 1536 wells. Alternatively, samples can also be provided in other sample vessels commonly used in the laboratory such as test tubes (e.g. 0.5 ml or 1.5 ml test tubes) or 6-well plates/12-well plates, 24-well or other plate formats. The use of standard microplates is preferred because, as already mentioned, they have a uniformly large base area and can, therefore, be moved in a uniform and automated manner. For example, containers of various sizes can be picked up and positioned relative to the luminescence optical device 10 and the injector 2 using the same pick-up device.

In all embodiments of the luminescence measuring device 1, the injector needle 6 of the injector 2 preferably extends below the luminescence optical device 10. At least part of the injector needle 6 is arranged in this case below the luminescence optical device 10 for luminescence measurement. Preferably in all embodiments, the outlet end 25 of the injector needle opens into the measuring region 23 of the luminescence optical device 10. Thus, essentially simultaneously in the same well 9 of the microplate 8, a reagent can be delivered with the injector 2 into the sample of the well and measured with the luminescence optical device 10. The measurement of the luminescent light of the light starts at the same time as the start of the reagent addition by the injector needle 6. It is particularly preferred to start the measurement of the luminescent light before the start of the addition of the reagent. It has proved successful to start the measurement up to 1 sec before adding the reagent. Cumbersome shifting of the microplate from an injector position to a measuring position, as it is necessary with luminescence measuring devices with a spatial offset of injector and luminescence optical device, can thus be avoided, since the outlet 25 is already located above the well 9 of the microplate 8, which is positioned in the measuring region 23 of the luminescence optical device. In addition, the time required for shifting could result in the beginning of the fast flash luminescence not being captured by the measurement.

Also preferably in all embodiments, the luminescence measuring device 1 comprises according to the invention a spray deflector 16, which is arranged between the outlet end 25 of the injector 2 and the luminescence optical device 10 for luminescence measurement and extends substantially perpendicularly to the optical axis 20, and covers at least the measuring region 23 of the luminescence optical device 10. The spray deflector 16 thus has no openings through which, for example, an injector needle could be guided. It extends without interruption at least over the measuring region 23.

It is made possible in particular by the combination of the arrangement of the injector needle 6 with its outlet end 25 below the luminescence optical device 10 and the provision of a continuous spray deflector between the luminescence optical device 10 and the outlet end 25 of the injector 2, that reagents for triggering a luminescence can be delivered into a sample without endangering the sensitive luminescence optical device 10, and nevertheless the measurement with the luminescence optical device 10 can already be started with the addition of the reagent. This is particularly advantageous when flash luminescence is used for sample analysis, since highly reactive reagents have to be added to the sample as reaction triggers and luminescence is triggered abruptly and can only be detected over a relatively short period of time (from the start of the reaction up to, for example, 5 sec).

Preferably in all embodiments, the luminescence measuring device 1 comprises a carriage 18 with which a microplate 8 can be positioned relative to the outlet end 25 of the injector 2 and correspondingly also relative to the luminescence optical device 10 for measuring luminescence light. In the figures, the carriage 18 is shown movable in X-direction, Y-direction and Z-direction of a three-dimensional coordinate system. Such mobility of the carriage along all three spatial axes of the three-dimensional coordinate system is particularly preferred since it allows an exact positioning of a sample with respect to the injector 2 and also with respect to the luminescence optical device 10. The carriage is preferably configured to be movable at least along the X-axis. Depending on requirements, the carriage 18 can then be additionally configured to be movable along the Y-axis and/or along the Z-axis. Mobility can be achieved by means of a motor (not shown), which is preferably monitored and controlled by a central control unit 30.

The carriage 18 is especially preferably configured in such a way that a standard microplate can be placed stably on it. For this purpose, the carriage 18 may be configured, for example, as a frame comprising stops against which an attached microplate 8 is held in a defined position by spring-loaded pressure means when placed on the carriage. The pressure means are preferably configured so that a microplate can be inserted or removed manually or automatically by a robot arm.

Luminescence optical devices 10 and detectors 12 for the measurement and detection of luminescence signals are also generally known from the prior art. Such a luminescence optical device 10 preferably comprises a lens system 11 with which luminescence light emitted from a sample is bundled and imaged onto the detector 12. To detect the luminescent light directed onto the detector 12, said detector 12 comprises a photomultiplier, photodiodes, photodiode arrays and/or avalanche diodes. Using a control unit 30, the detected luminescent light can then be converted into an intensity signal and, optionally, further be processed for the output to a user.

Especially the luminescence optical device 10 can be surrounded by a housing 13. With such a housing 13 it can be avoided that disturbing ambient light falls on the lens system 11 and thus falsifies the detection of luminescent light from a sample. In addition, the luminescence optical device 10 is protected from other environmental influences such as dust etc., and all elements of the luminescence optical device 10 can easily be repositioned together. The luminescence detector 12 can also be surrounded by the housing 13, or it can otherwise be coupled directly to the luminescence optical device 10 or its housing 13. In another alternative embodiment, the luminescence detector 12 is arranged separately from the luminescence optical device 10 and connected to it via a light guide system (not shown).

Analogously, as shown in FIG. 1, at least the supply line 4 of the injector 2 can also be enclosed by a housing 19. This can be particularly preferred if it is intended that the spray deflector 16 is connected to the injector 2. Such a connection is preferred if, for example, the spray deflector 16 is to be movable along an axis of a three-dimensional coordinate system (for example along the X-axis) with the injector 2 in order to pull the spray deflector 16 out of the closely installed environment with the luminescence optical device 10 and, for example, to clean it or replace it with another spray deflector. A displaceability of an injector along one or more axes and/or even a rotatability of the injector around at least one of the axes can be provided, regardless of whether the injector is arranged horizontally as in FIG. 1 or vertically as in FIG. 2.

FIG. 1 shows as an example that the housing 19 for the supply line 4 of the injector 2 is part of a holder 17 for the plate-like spray deflector 16. The holder 17 for the spray deflector 16 is thus partially integrated into the injector or its housing 19. FIG. 1 also shows examplily that at least the supply line 4 of the injector 2 with its housing 19 and the injector needle 6 is movable along the X-axis of a coordinate system. In this embodiment, the housing 19 of the injector 2 is part of a holder 17 for the spray deflector 16. The remaining part of the holder 17 for the spray deflector 16 is formed by additional holding structures, which, in this case, are also connected to the injector 2 or its housing 19. If the injector 2 with its supply line 4, the injector needle 6 and the housing 19 are moved to the left along the X-axis, the additional holding structures of the holder 17 and the spray deflector 16 lying on the holder are also moved to the left. The housing 19 of the injector, therefore, provides a structural connection between the injector and the spray deflector so that the injector 2 can be moved with the spray deflector 16 as a structural unit.

It is particularly preferred that the spray deflector 1 is platelet-shaped in all embodiments, i.e. a continuous, flat body. Preferably, this flat body covers at least the measuring region 23 of the luminescence optical device 10 for luminescence measurement completely, especially preferably the spray deflector 16 is so large that it covers and protects the side of the luminescence optical device 10 facing the microplate 8 as completely as possible against possible splashes, which can occur from the liquid discharged into a well 9 through the lower outlet end.

The spray deflector 16 is particularly preferably arranged to be interchangeable in the luminescence measuring device 1. For this, the luminescence measuring device 1 preferably includes a holder 17 for the spray deflector 16, which has an upper support surface on which the spray deflector 16 can easily be placed. The holder 17 comprises a circular opening which allows at least light of the measuring region 23 of the luminescence optical device 10 to pass through. The holder 17 can include an upper recess in the area of the opening to form a shoulder on which the spray deflector 16 can be placed. Alternatively or additionally, the holder can have simple fastening means such as snap fasteners with which the spray deflector 16 is held on the support surface.

As already discussed, the holder 17 can be attached to the injector 2 or its housing 19 or the injector 2 or its housing 19 forms part of the spray deflector holder 17. In this way, the platelet is immovably arranged in relation to the injector but can be moved with the injector 2.

In a particularly preferred embodiment of the spray deflector 16, it is at least partially optically transparent, wherein it is optically transparent at least in the area with which it is positioned in the measuring region 23 of the luminescence optical device 10. This ensures that luminescent light emitted by a sample falls unhindered onto the luminescence optical device 10 and can be transmitted to the detector 12 without loss of intensity. The spray deflector 16 is preferably made of borosilicate glass, which is offered under the name Borofloat® by Schott. The spray deflector 16 is particularly preferred being platelet-shaped and made entirely of borosilicate glass.

In an alternative embodiment, the spray deflector 16 is not formed optically transparent for all wavelengths but instead is configured as an optical filter. In this case, the spray deflector 16 preferably has filter properties, which make it at least impermeable to light in the red region, preferably for light with a wavelength of 600 nm to 800 nm, particularly preferably for light with a wavelength of 620 nm to 750 nm. In this way, light in the red region emitted by the sample or microplate is absorbed.

The use of such an alternative spray deflector 16 with additional filter function can be advantageous if, for example, autoluminescence of microplates 8 is to be filtered out for luminescence measurement in the context of a specific assay. In particular, the use of white microplates has shown that autoluminescence signals originating from the material of the white microplate can falsify the actual luminescence measurement. Such autoluminescence signals comprise, in particular, light in the red region, which is absorbed by the corresponding filter function of the spray deflector 16 during the luminescence measurement.

White microplates are preferably used for luminescence measurements since the reflective properties increase the detectable luminescence light and thus the light yield. Black microplates are mainly used for fluorescence measurements; they are unsuitable for luminescence measurements because they swallow a relatively large amount of light and thus reduce the signal intensity. Although clear microplates could be used for flash luminescence assays due to the strong signal, in assays based on glow luminescence, the clear material causes crosstalk between the individual wells, so that a measured signal would be falsified to such an extent that it would not be reproducible in a later evaluation.

Figure 2:
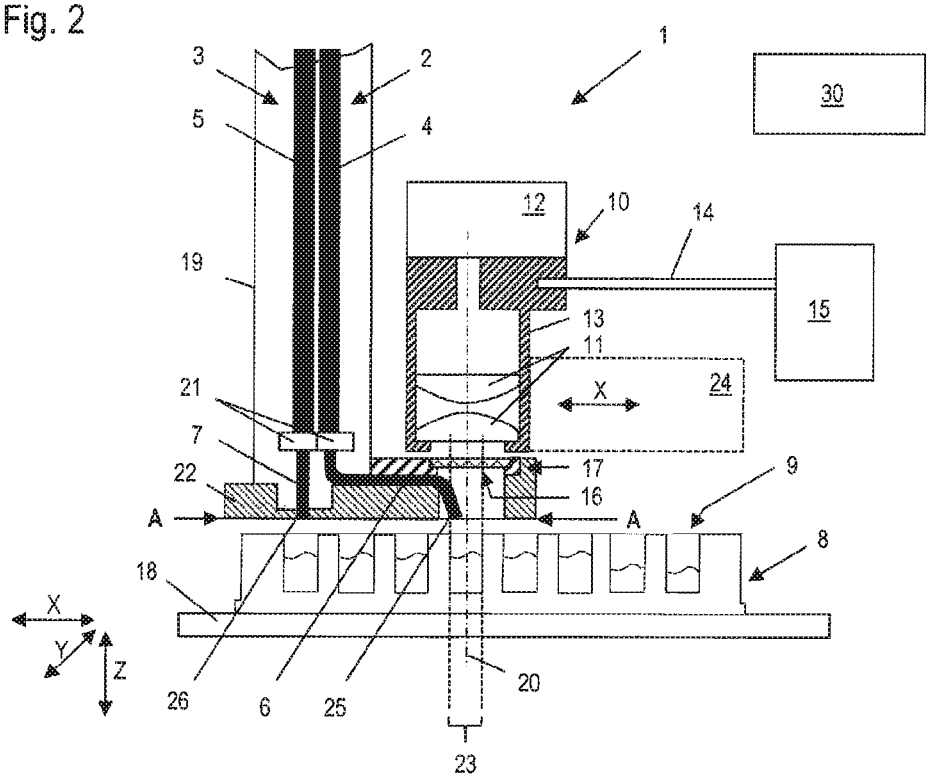
FIG. 2 shows a schematic overview drawing of an exemplary luminescence measuring device with two vertically arranged injectors.

FIG. 2 shows a particularly preferred luminescence measuring device 1, which comprises two injectors 2,3 for dispensing liquids. This particularly preferred embodiment is particularly suitable for carrying out flash luminescence measurements, since two solutions are often used to trigger a flash luminescence:

EXAMPLE 1

HBsAg Chemiluminescence Immuno-Assay of the Company DiaSorin S.p.A

Solution A: Sodium hydroxide to provide an alkaline environment with a peroxidase as a catalyst;
Solution B: Hydrogen peroxide for a sudden start of the reaction.

EXAMPLE 2

ADVIA Centaur HBsAg Chemiluminescence Immuno-Assay from Bayer Healthcare, LLC

Solution A: Hydrogen peroxide and nitric acid to provide an acidic environment;

Solution B: Sodium hydroxide solution and a wetting agent for a sudden start of the reaction.

Analogous to the first injector 2, the second injector 3 also comprises an injector needle 7 with an outlet end 26 and a supply line 5 with which liquid is supplied to the injector needle 7. In the embodiment shown in FIG. 2, the injectors 2,3, in particular their supply lines 4,5, are arranged essentially vertically in relation to a microplate 8 and thus essentially parallel to the optical axis of the luminescence detector 12.

A vertical arrangement of the injector 2 or the injectors 2,3 is particularly preferred for embodiments in which the luminescence optical device 10 is configured being in a displaceable manner in order to replace the spray deflector 16. A horizontal arrangement of the injector 2 or the injectors 2,3 is preferred, in particular, for embodiments in which the injector or injectors 2,3 is or are configured to be displaceable in order to replace the spray deflector 16.

The outlet end 26 of the second injector 3 is preferably arranged at a distance from the outlet end 25 of the first injector 2. It is particularly preferred that the outlet end 2 of the second injector 3 is spaced at a distance from the outlet end 25 of the first injector 2, which corresponds substantially to one or a multiple of an axial distance of the wells 9 of the microplate 8. In FIG. 2, the two outlet ends 25,26 are shown spaced apart by a distance that is essentially three times the axial distance of the wells 9 of the microplate. It is also essential here that the injector needle 6 of the first injector 2 also extends according to the invention in this embodiment to below the luminescence optical device 10 and opens with its outlet end 25 into the measuring region 23 of the luminescence optical device 10. At least part of the injector needle 6 is arranged in this case under the luminescence optical device 10 for luminescence measurement.

Due to the special arrangement of the two injectors 2,3, a first reagent, such as solution A, can first be dispensed into a selected well 8 with the second injector 3, so that the reaction conditions (pH, volume, buffer properties, etc.) can be adjusted in this step. At the same time, the actual reaction can be triggered in a spaced well 8, into which solution A has already been added with the second injector 3, by adding solution B with the first injector 2 and the luminescence measurement in this spaced well 8 may be started.

Due to the arrangement of the continuous spray deflector 16 between the outlet 25 of the first injector 2 and the luminescence optical device 10 in accordance with the invention, the solution A can also be discharged with a defined pressure into the well 9 in the measuring region 23 of the luminescence optical device 10 with the first injector 2, so that by adding this starting solution it is mixed directly with the sample without splashes striking the sensitive luminescence optical device 10.

The injector needle 7 of the second injector 3 (the injector shown on the left) can be a simple plastic hose, for example, made of polytetrafluoroethylene (PTFE/Teflon® from DuPont). Such a plastic hose can be a simple extension of the supply line 5, which tapers towards the outlet end 26 if necessary. The outlet end 26 can be arranged such that a microplate 8 positioned below the outlet end 26 with a well 9 can be positioned in relation to the outlet end 26 such that the outlet end 26 is centered exactly above the well 9 (FIG. 2). Alternatively, the outlet end 26 may be arranged so that it is arranged eccentrically above the well 9 (not shown).

In the particularly preferred embodiment shown in FIG. 2, the injector needle 6 of the first injector 2 is shown bent into an S-shape. In this way it may be achieved that the supply line 4 of the injector 2 is arranged vertically and parallel to the optical axis 20 of the luminescence optical device 10, while at the same time ensuring that it opens substantially with its outlet end 25 into the measuring region 23 of the luminescence optical device 10 and can thus discharge liquid into the same well on which the luminescence optical device 10 is aligned for luminescence measurement.

To achieve this bend, the injector needle 6 of the first injector 2 is preferably made of a metal or a dimensionally stable plastic. Exemplarily mentioned in this case is PEEK (polyetheretherketone).

In order to capture the flash luminescence signal as completely as possible, it is also necessary to add the reagents in such a way as to ensure rapid and complete mixing of the reaction partners.

At least in the area of the outlet end 25 of the first injector 2, a certain dimensional stability is desirable in order to ensure a constant, defined angle of the last bending section. This allows liquids to be dispensed into a well 9 at a predeterminable pressure and/or at a predeterminable dispensing rate, to control the desired mixing effect of the reagents. In addition to good mixing of the reagents, a high dispensing speed at a certain angle can also be used to swirl magnetic beads as part of the assays in the sample liquid of well 9 with the reaction solution. Preferably the defined angle lies in the range of 5° to 15° to the optical axis 20.

For preferably all embodiments of the luminescence measuring device 1, holders 21 can be provided for the supply lines 4,5 and/or the connection points between supply line 4,5 and injector needle 6,7 for both injectors 2,3, as shown in FIG. 2. Optionally, the injectors 2,3 may in all embodiments be enclosed by a housing 19 in which such holders 21 are mounted. The advantage of using a housing 19 at least for the injector supply lines 4,5 is that, as already discussed in FIG. 1, the enclosed parts can be easily moved as a unit.

The spray deflector 16 according to the invention is placed on a holder 17 separate from an injector housing 19 according to the embodiment shown in FIG. 2. This holder preferably comprises a support surface on which the platelet-shaped spray deflector 16 can be placed. In a particularly preferred embodiment, the spray deflector 16 is simply placed on the support surface of the holder 17 without the use of additional fastening means, so that the spray deflector 16 can easily be replaced. It may be provided that the holder is attached to a housing for the injector(s). This variant is preferred if the spray deflector 16 is to be movable with the injector. Alternatively, it may be provided that the holder 17 of the spray deflector is fixed directly to a base of the luminescence measuring device 1, for example by means of additional support structures 22 or other connecting means such as a click closure, independently of an injector housing.

To enable the spray deflector 16 to be replaced, at least either the luminescence optical device 10 or the injector(s) 2,3 can be moved away, so that the spray deflector 16 is accessible, for example, to qualified personnel. FIG. 1 shows an embodiment of the luminescence measuring device in which the injector 2 with the spray deflector 16 and its holder 17 can be moved in X-direction. In this way, the spray deflector 16 is moved away from the luminescence optical device 10 and is therefore accessible from above or from the side.

In the particularly preferred embodiment shown in FIG. 2, the luminescence optical device 10 is displaceable horizontally, i.e. along the X-axis of a three-dimensional coordinate system. Alternatively, the optics can also be moved upwards along the Z-axis to make the spray deflector accessible for replacement by skilled personnel (not shown), or both the injector and the optics can be moved with respect to each other (not shown); for the reason of space, however, this variant may be less preferred.

It can be provided that the luminescence optical device 10 is configured to be motorized and movable. For this purpose, it comprises a drive with a drive rod 14 and a drive motor 15. It may further be provided that the luminescence measuring device 1 comprises a maintenance area 24 into which the luminescence optical device 10 can be displaced into a maintenance position to such an extent that the spray deflector 16 and its holder 17 are accessible from above or from the side. The maintenance area 24 can be a simple recess in support structures of the luminescence measuring device 1 or in separate support structures. To replace the spray deflector 16, the luminescence optical device 10 can then be moved into the recess in a motorized manner until it has reached the maintenance position in which access to the spray deflector 16 is free.

Figure 3:
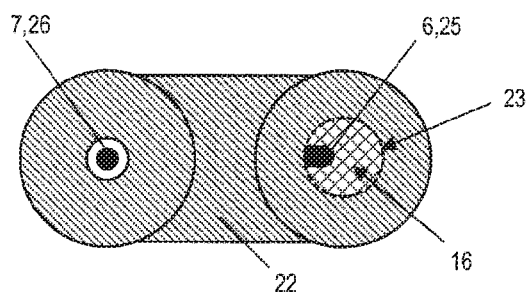
FIG. 3 shows a schematic sectional view from below on a luminescence measuring device according to FIG. 2 on the section plane A.

FIG. 3 shows a schematic sectional view from below of the particularly preferred luminescence measuring device according to FIG. 2 on section plane A. The supporting structures 22, with which the two injectors 2,3 are fixed to the bottom of the luminescence measuring device 1, are particularly clearly visible. Also shown are the outlet ends 25,26 of the two injectors 2,3 in a bottom view. In the area of these outlet ends 25,26, the support structures 22 each have an opening. The opening for the S-shaped curved injector needle is dimensioned larger so that the measuring region 23 of the luminescence optical device 10 is not limited by these support structures 22. Through the same opening, the spray deflector 16 is also visible in this view. Alternative fastening methods in a microplate reader 27 are known to persons skilled in the art and will not be discussed further here.

The opening for the outlet end 26 of the second injector 3 can be adapted to the desired situation; a person skilled in the art would make it smaller in diameter if it is desired that the supporting structures surround the area of the injector needle 7 as much as possible and support it in this way; or it could alternatively be larger, for example for space or weight reasons.

Figure 4:
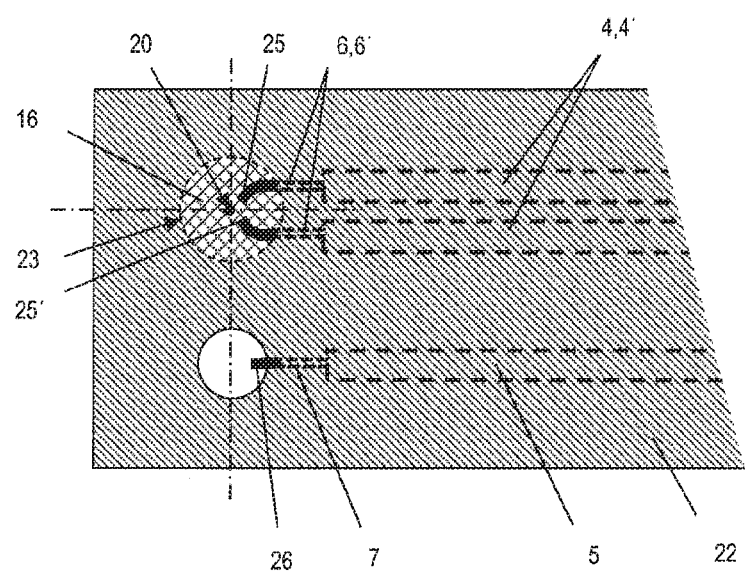
FIG. 4 shows a schematic sectional drawing from below on a luminescence measuring device with up to three horizontally arranged injectors.

FIG. 4 shows a schematic sectional view from below of a luminescence measuring device 1, which essentially corresponds to the one shown in FIG. 1, but which comprises not only one but three injector supply lines 4,4',5, which are arranged essentially horizontally, i.e. perpendicular to the optical axis 20 of the luminescence optical device 10. In comparison to the arrangement shown in FIG. 1, the supply lines 4,4',5 shown in FIG. 4 are shown mirror-inverted. In the side view of the luminescence measuring device 1 the additional supply lines 4,4',5 would not be visible; in FIG. 4 the supply lines are shown dashed.

As in FIG. 3, support structures 22 are also clearly visible in FIG. 4, to which in particular the respective supply line 4,4',5 of the injector 2 or the injectors are preferentially attached. The corresponding openings in the support structures 22 for the outlet(s) of the respective injector needle(s) 6,6',7 are also clearly visible.

According to FIG. 4, the luminescence measuring device 1 may comprise at least two injectors whose injector needles 6,6' are arranged in relation to the luminescence optical device 10 in such a way that their outlet ends 25,25' both open into the measuring region 23 of the luminescence optical device 10. In this arrangement the outlet end 25' of the second injector is positioned over the same well 9 of the microplate 8 as the outlet end 25 of the first injector 2. The spray deflector 16 is also clearly visible in this view.

The supply line 5 of a third injector 3 shown in FIG. 4 is at a distance with its outlet end 26 from the outlet end 25,25' of one of the two other injectors, which corresponds to the axial distance of a well 9 of a microplate 8.

A possible displaceability of the injectors is not shown in FIGS. 3 to 6. The explanations on the displaceability to FIGS. 1 and 2 apply to all the embodiments described here and will not be repeated in the following. This also applies to the explanations on the embodiments of the other elements of the luminescence measuring device.

The previously described embodiments and variants of the luminescence measuring device 1 according to the invention can be installed in a so-called luminometer, i.e. in an independent device. Such instruments are not necessarily configured for reading out samples in a microplate, but can also be adapted for the analysis of samples in other sample vessels such as cuvettes, sample tubes, etc. The above explanations, which are based on a standard microplate as a sample vessel, can be transferred to such other sample vessels.

As an alternative and particularly preferred option, the luminescence measuring device 1 according to the invention is integrated in a microplate reader 27, i.e. in an instrument specially configured for the analysis of samples in standard microplates 8. The carriage 18 in particular is automated in such a microplate reader 27 and can preferably be moved in all three directions of a three-dimensional coordinate system so that each well 9 of a microplate 8 can be positioned exactly relative to each injector and each optical system.

It is also preferred that, if possible, the entire test sequence including positioning of the wells in relation to measuring devices and/or injectors as well as the injection of liquids is centrally controlled by a control unit 30. Such a control unit 30 is shown in FIGS. 1, 2, 5 and 6. It is up to the knowledge of a person skilled in the art which processes in a microplate reader 27 are controlled by the control unit 30.

Such a particularly preferred microplate reader 27 may, in addition to the luminescence measuring device 1 according to the invention, include further measuring devices 28,29 for measuring a fluorescence signal from samples in a well 9 of a microplate 8 and/or for measuring an absorption of samples in a well 9 of the microplate 8. The principle of fluorescence measurements in microplate readers 27 is known to persons skilled in the art and will therefore not be explained here. Also known is the measurement of the absorption of a sample, wherein, in this case, the light transmitted (or allowed to pass) by a sample is first determined and the absorption of light by the sample is calculated from this. Such microplate readers 27, with which more than one signal can be optically measured, are also called multimode readers.

Figure 5:
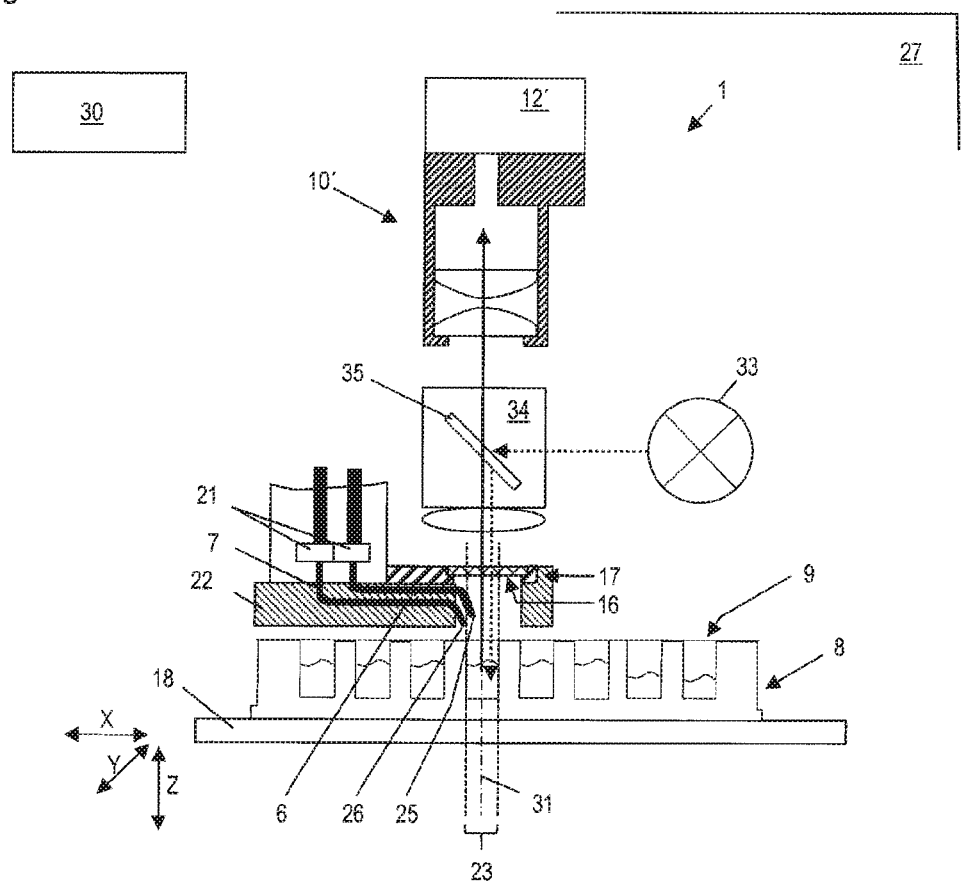
FIG. 5 shows a schematic overview drawing of an exemplary luminescence measuring device in a microplate reader with two injectors and devices for luminescence and fluorescence measurements.
Figure 6:
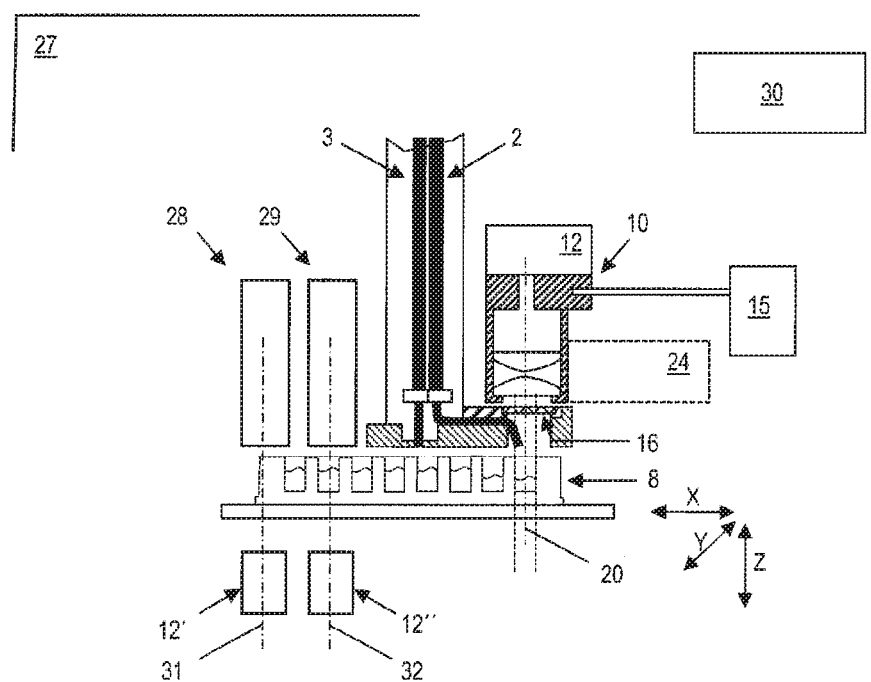
FIG. 6 shows a schematic overview drawing of a multi-mode microplate reader with a luminescence measuring device according to the invention.

FIGS. 5 and 6 show different multimode readers 27, which comprise the luminescence measuring device 1 with the spray deflector 16 arranged according to the invention. The luminescence measuring device 1 further comprises at least the first injector 2, the injector needle 6 of which extends as described above below the luminescence optical device 10 and opens with its outlet 25 into the measuring region 23 of the luminescence optical device 10. With this injector needle 6, for example, a reagent for triggering luminescence can be delivered into the same well 9 to which the luminescence optical device 10 with its optical axis 20 is aligned.

The microplate reader 27 shown in FIG. 5 is specially configured for capturing a flash fluorescence signal from a sample. For this purpose, the microplate reader 27 comprises an arrangement for measuring flash fluorescence in a well 9 with, for example, two injectors, the injector needles 7 of which, with their outlet ends 25,26, both open into the measuring region 23 of an optical system, which is configured as a fluorescence optical device 10'. For better illustration, the injector needles 6,7 are shown one above the other; however, it is also preferred in this embodiment that the two injector needles 6,7 are arranged side by side, as indicated in FIG. 4.

In addition, an optical device 34 with a dichroic mirror 35 is arranged between the fluorescence optical device 10' and the spray deflector 16. With a light source 33, excitation light can be directed via the dichroic mirror 35 onto the sample in the well 9, which is positioned in the measuring region 23 of the fluorescence optical device 10' (represented by dashed arrows). Fluorescent light coming from the sample is then directed by means of the fluorescence optical device 10' onto a detector 12' for fluorescent light (represented by continuous arrows).

Although not shown in FIG. 5, the fluorescence optical device 10' can also be located below the well 9 (so-called bottom reading). In this configuration, the spray deflector 16 protects the optical device 34 with dichroic mirror 35 from splashes. Instead of the fluorescence optical device 10', a fluorescence imaging device can also be provided.

With the fluorescence optical device 10', 33, 34, 12' arranged above this well 9, the measurement of a resulting flash fluorescence can then be performed analogously to a previously described flash luminescence essentially simultaneously with the injection of the reagent that triggers flash luminescence. In neuron research, dyes are used that react very quickly to changes in cell membrane potentials. Reagents can be added to cell suspensions via an injector, which cause a potential change, which in turn triggers a color reaction. The color reaction can consist of a flash fluorescence or a flash absorption change (review article: Joel C. Glover et al., Dev. Neurobiol. 2008 May; 68(6):804-16).

Due to the arrangement of the spray deflector 16 in accordance with the invention, the sensitive optical device above the well 9, into which a reagent was delivered, are protected against splashes.

The arrangement of the detector 12' for fluorescence above the well is known as a so-called top-reading arrangement; alternatively, the fluorescence of the sample can also be detected with a bottom-reading arrangement. Such an arrangement is outlined in FIG. 6, as well as a known arrangement of a measuring device 29 for absorption measurement with an absorption detector positioned below the microplate. The multimode reader shown in FIG. 6 thus comprises, in addition to the luminescence measuring device 1 according to the invention with the spray deflector 16, known measuring systems from microplate readers for measuring fluorescence signals 12' and for measuring the absorption of a sample 12".

The present invention also relates to a method for measuring a luminescence signal of a sample in a well 9 of a microplate 8. It comprises the following steps:

Providing a luminescence measuring device 1, which comprises:
a first injector 2 for dispensing a reagent into a well 9 of a microplate 8, wherein the injector 2 comprises an injector needle 6 having an outlet end 25,
a luminescence optical device 10 with a vertically extending optical axis 20 and a measuring region 23 enclosing the optical axis 20 for measuring a luminescence signal of a sample in a well 9 of a microplate 8,
wherein the injector needle 6 of the injector 2 extends to below the luminescence optical device 10 and opens with its outlet end 25 into the measuring region of the luminescence optical device 10, and
a spray deflector 16, which is arranged above the outlet end 25 of the injector 2 and below the luminescence optical device 10, and which extends substantially perpendicularly to the optical axis 20 and completely covers at least the measuring region 23 of the luminescence optical device 10,
dispensing a reagent into a well 9 of a microplate 8 using the injector 2,
measuring of a luminescence signal of the sample in the same well 9 of the microplate 8 along the optical axis 20 and in the measuring region 23 of the luminescence optical device 10,
wherein the dispense of a reagent occurs substantially simultaneously with starting the measurement of the luminescence signal of the sample in the same well 9.

If the luminescence measuring device 1 comprises an additional injector for triggering a flash luminescence, the method can be carried out as follows:

Providing a luminescence measuring device 1, which comprises:
a first injector 2 for dispensing a reagent into a well 9 of a microplate 8, wherein the first injector 2 comprises an injector needle 6 having an outlet end 25,
a luminescence optical device 10 having an optical axis 20 extending substantially perpendicularly to the microplate 8 and a measuring region 23 enclosing the optical axis 20 for measuring a luminescence signal of a sample in a well 9 of the microplate 8,
wherein the injector needle 6 of the first injector 2 extends to below the luminescence optical device 10 and opens with its outlet end 25 into the measuring region 23 of the luminescence optical device 10,
a spray deflector 16, which is arranged above the outlet end 25 of the injector 2 and below the optical device 10 and which extends substantially perpendicularly to the optical axis 20 and completely covers at least the measuring region 23 of the luminescence optical device 10, and
a second injector 3 comprising an injector needle 7 and an outlet end 26, wherein the outlet end 26 of the second injector 3 is spaced from the outlet end of the first injector 2 by a distance in relation to the outlet end 25 of the first injector 2, which corresponds to one or a multiple of an axial distance of the wells of the microplate 8,
dispensing a first reagent into a well 9 of the microplate using the second injector 3,
if necessary, move the microplate 8 with the carriage 18 and position this well 9 in the measuring region 23 of the luminescence optical device 10,
dispensing a second reagent with the first injector 2 into the same well 9,
measuring a flash luminescence signal of the sample in the same well 9 of the microplate 8 along the optical axis 20 and in the measuring region 23 of the luminescence optical device 10,
wherein the dispensing of the second reagent occurs substantially simultaneously with the starting of the measurement of the flash luminescence signal of the sample in the same well 9.

| List of reference numerals | |
|---|---|
| 1 | Luminescence measuring device |
| 2 | First injector |
| 3 | Second injector |
| 4 | Supply line from 2 |
| 5 | Supply line from 3 |
| 6 | Injector needle from 2 |
| 7 | Injector needle from 3 |
| 8 | Microplate |
| 9 | Wells of 8 |
| 10 | Luminescence optical device |
| 10' | Fluorescence optical device |
| 10" | Optical device for absorption measurements |
| 11 | Lens system of 10 |
| 12 | Luminescence detector |
| 12' | Fluorescence detector |
| 12" | Detector for absorption measurements |
| 13 | Housing of 10 |
| 14 | Drive rod |
| 15 | Drive motor |
| 16 | Spray deflector |
| 17 | Holder for 16 |
| 18 | Carriage |
| 19 | Housing from 2, 3 |
| 20 | Optical axis of 10 |
| 21 | Holders for 4, 5 |
| 22 | Support structure |
| 23 | Measuring region of 10 |
| 24 | Maintenance area from 1 |
| 25 | Outlet end of 6 |
| 26 | Outlet end of 7 |
| 27 | Microplate reader |
| 28 | Measuring device for fluorescence measurement |
| 29 | Measuring device for absorption measurement |
| 30 | Control unit |
| 31 | Optical axis of 28 |
| 32 | Optical axis of 29 |
| 33 | Light source |
| 34 | Optical device |
| 35 | Dichroic mirror |

The invention claimed is:

1. Measuring device for the measurement of light signals emitted from samples in wells of a microplate, wherein the measuring device comprises:
    a first injector for dispensing a reagent into a well of a microplate, wherein the first injector comprises an injector needle having an outlet end, and
    an optical device having an optical axis extending substantially perpendicularly to the microplate and a measuring region surrounding the optical axis for measuring a light signal of a sample in a well of the microplate,
    wherein the injector needle of the first injector extends to below the optical device and opens with the outlet end into the measuring region of the optical device, so that measurement can be carried out in the same well of the microplate with the optical device and a reagent can be dispensed with the first injector,
    characterized in that the measuring device comprises a spray deflector, which is arranged between the outlet end of the first injector and the optical device, and which extends substantially perpendicularly to the optical axis and completely covers at least the measuring region of the optical device,
    wherein the spray deflector is optically transparent.

2. Measuring device according to claim 1, which is a luminescence measuring device for measuring luminescence signals of samples in wells of a microplate, wherein the optical device is a luminescence optical device having an optical axis extending substantially perpendicularly to the microplate and a measuring region surrounding the optical axis for measuring a luminescence signal of a sample in a well of the microplate.

3. Measuring device according to claim 1, characterized in that a holder, which holds the spray deflector, is attached to the first injector.

4. Measuring device according to claim 3, characterized in that the first injector is enclosed by a housing, and that the holder for the spray deflector is fastened to the housing.

5. Measuring device according to claim 3, characterized in that the holder comprises an upper support surface on which the spray deflector can be placed.

6. Measuring device according to claim 1, characterized in that the spray deflector is at least partially made of a borosilicate glass.

7. Measuring device according to claim 1, characterized in that the spray deflector is a platelet.

8. Measuring device according to claim 1, characterized in that the first injector comprises a supply line, which is arranged at a distance from the optical device and from the optical axis of the optical device, and that the injector needle is connected to the supply line with an end opposite to the outlet end.

9. Measuring device according to claim 1, comprising a second injector for dispensing a reagent into a well of the microplate, wherein the second injector comprises an injector needle with an outlet end, and that the outlet end of the second injector is arranged at a distance from the outlet end of the first injector.

10. Measuring device according to claim 9, characterized in that the outlet end of the second injector is spaced apart from the outlet end of the first injector by a distance, which corresponds substantially to one or a multiple of an axial distance of the well of the microplate.

11. Measuring device according to claim 9, characterized in that the first injector and the second injector are enclosed by a housing, and that a holder for the spray deflector is attached to the housing.

12. Measuring device according to claim 1, characterized in that the optical device is configured being displaceable in a horizontal direction.

13. Measuring device according to claim 12, comprising a drive with a drive rod and a drive motor for displacing the optical device.

14. Measuring device according to claim 12, comprising a maintenance region into which the optical device can be displaced into a maintenance position so that the spray deflector and the holder are accessible.

15. Microplate reader, comprising:
    at least one measuring device selected from a group comprising:
    a measuring device for measuring a fluorescence signal from samples in wells of a microplate, and
    a measuring device for measuring an absorption of samples in wells of the microplate;
    a carriage for receiving the microplate and for positioning the received microplate in relation to the measuring device or devices;
    characterized in that the microplate reader further comprises a luminescence measuring device according to claim 2.

* * * * *